United States Patent [19]

El-Meligy

[11] Patent Number: 5,247,465

[45] Date of Patent: Sep. 21, 1993

[54] HIGH RESOLUTION CONVERTER

[75] Inventor: Abdelsalam El-Meligy, Eden Prairie, Minn.

[73] Assignee: Rosetta Micro Systems, Inc., Plymouth, Minn.

[21] Appl. No.: 702,334

[22] Filed: May 20, 1991

[51] Int. Cl.$^5$ .............................................. G01P 13/00
[52] U.S. Cl. .................... 364/562; 364/577; 364/433; 340/977
[58] Field of Search ............... 364/558, 562, 433, 434, 364/424.06, 506, 577; 73/386, 384; 340/970, 977

[56] References Cited

U.S. PATENT DOCUMENTS

| | | | |
|---|---|---|---|
| 3,889,104 | 6/1975 | Smith | 364/433 |
| 4,292,671 | 9/1981 | Evans et al. | 364/433 |
| 4,442,490 | 4/1984 | Ross | 364/433 |
| 4,446,745 | 5/1984 | Stone et al. | 364/506 |
| 4,490,794 | 12/1984 | Griffith et al. | 364/433 |
| 4,507,962 | 4/1985 | Hitt et al. | 364/433 |

*Primary Examiner*—Kevin J. Teska
*Assistant Examiner*—Jae H. Choi
*Attorney, Agent, or Firm*—Palmatier, Sjoquist & Helget

[57] ABSTRACT

An apparatus for converting aircraft altitude encoder measurements into higher resolution values, including a microprocessor connected to monitor the aircraft altitude encoder output signals, a pressure transducer and converter network for providing incremental pressure change readings, also connected to the microprocessor; the microprocessor being programmed to utilize the incremental pressure readings to calculate corresponding incremental altitude signals between transition points of the aircraft altitude encoder readings. The method of the invention includes the steps of monitoring aircraft altitude encoder transition points, reading incremental pressure variations between transition points, and calculating incremental altitude variations between altitude encoder transition points.

7 Claims, 2 Drawing Sheets

HIGH RESOLUTION CONVERTER

BACKGROUND OF THE INVENTION

The present invention relates to aircraft altitude instruments, and more particularly to an apparatus for providing a higher resolution indication of aircraft altitude than is presently available from conventional devices.

Aircraft altimeters conventionally operate under the principle of measuring the output of a pressure transducer on the aircraft, after adjustment for local ground barometric pressure variations, and converting the pressure measurement into an altitude represented on a meter or dial in feet. Because of certain non-linearities in the various parameters measured, and including non-linearities caused by temperature, the prior art has utilized various forms of introducing correction for non-linearity.

The conventional aircraft altitude encoder, known as a "mode C" encoder, typically generates an 11-bit binary transmission code which is representative of altitude. For each 100-foot change in measured altitude, the encoder output signals change, utilizing a gray code convention, so that each code change is representative of a transition point in altitude measurement. The output from the conventional mode C encoder is typically interfaced with a radio transmitter or transponder that transmits the altitude signal on request to a ground air traffic control center, along with the aircraft identification. This information, after adjustment for local ground barometric pressure variations, may then be mapped on a radar screen in the control center, and is used to keep track of air traffic in a controlled zone. Of course, the altitude reading may also be presented on a suitable meter in the aircraft cockpit.

SUMMARY OF THE INVENTION

The invention includes a computer microprocessor which is connected to receive the signals from a mode C aircraft altitude encoder via a buffer circuit. The microprocessor is also connected to a low range pressure transducer via an analog amplifier and analog-to-digital converter. According to the method of operating the invention the microprocessor regularly receives data from the mode C encoder, particularly marking the transition point between 100-foot altitude increments. The microprocessor receives incremental pressure variations from the low range transducer and utilizes this information in conjunction with the mode C encoder information to calculate altitude information to a resolution one foot.

It is a principal object of the present invention to provide a method and apparatus for providing an indication of altitude to within a one-foot resolution.

It is another object and feature of the present invention to provide a monitoring of the aircraft mode C encoder, for purposes of subdividing the altitude readings between encoder transitions to a much higher degree of resolution than is available from the mode C encoder.

DESCRIPTION OF THE PREFERRED EMBODIMENT

Figure 1:
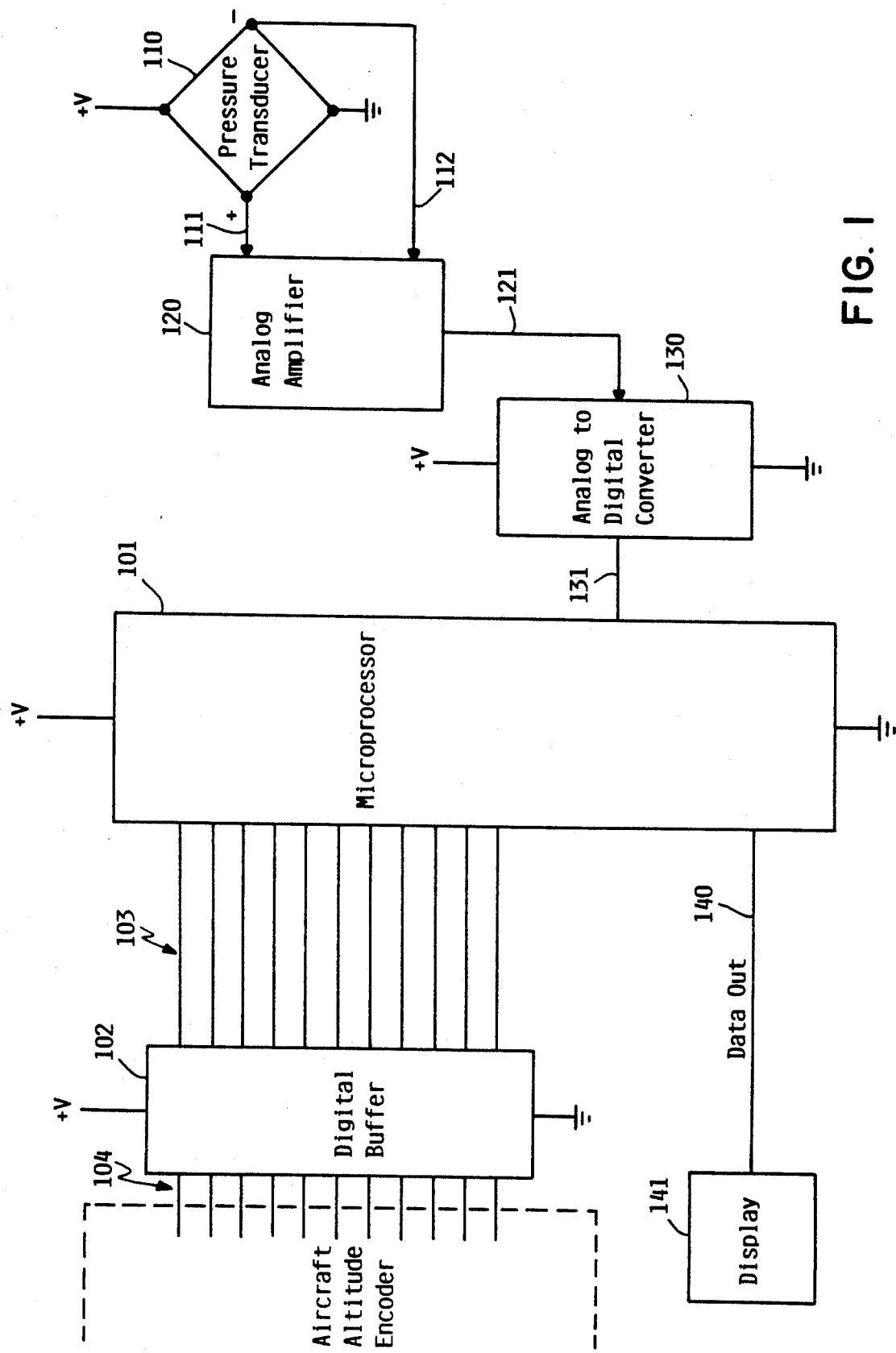
FIG. 1 shows a block diagram of the apparatus of the present invention.

Referring first to FIG. 1, there is shown a block diagram of the apparatus of the invention. A microprocessor 101 is connected to a digital buffer 102 via a plurality of communication lines 103. Microprocessor 101 may be selected from any of a number of commercially available microprocessors, typically incorporated into a single semiconductor circuit. A semiconductor Type S87C751, manufactured by Signetics, and designated a Signetics Microcontroller, is one such form of microprocessor which is usable with the invention. Digital buffer 102 may be obtained from Motorola, under Type Designation MC74HC74. Digital buffer 102 is connected to a conventional aircraft altitude encoder, such as any of the following: TCI D120P2T, BENDIX 99251, ROSETTA 8800, NARCO AR 850, NARCO AR 500, ACK 30, AEROMECH, SMITH AA6746, TERRA TRT-250. A characteristic of the aircraft altitude encoder is that it generates a gray code over its communication lines 104 connected to digital buffer 102, the gray code providing an indication of aircraft altitude. The gray code signal changes at each 100-foot increment in altitude, which is referred to as a "transition point" herein. The digital aircraft altitude encoder signal is transmitted to microprocessor 101 via lines 103 from digital buffer 102; the software within microprocessor 101 is particularly designed to recognize transition points in altitude as represented by changes in the gray code signal from the aircraft altitude encoder.

The gray code output signal from the aircraft altitude encoder is also used to interface with a radio transmitter signal in the aircraft, which radio transmitter transmits the altitude information on request to a ground air traffic control center, along with a signal identifying the aircraft. This information, after adjustment for local ground barometric pressure variations, is mapped on a radar screen in the control center, and is used to keep track of air traffic in a controlled zone.

A pressure transducer 110 is mounted on the aircraft, to detect small changes in absolute pressure at any given altitude. A pressure transducer such as Type MPX100A, manufactured by Motorola, is preferred for use in connection with the invention. Pressure transducer 110 typically has a pressure range of 0–15 pounds per square inch (psi), and it generates an electrical voltage on lines 111, 112 which is representative of pressure changes over the range of measurement. These voltage changes are connected to an analog amplifier 120, which may be Type LM224, manufactured by National Semiconductor. Analog amplifier 120 generates an amplified output signal representative of the pressure signal presented at its inputs, and transmits this output signal to analog-to-digital (A/D) converter 130 via line 121. A/D converter 130 converts the analog input signal it receives into a digital output signal. One form of A/D converter which is particularly useful with the present invention is Type AD654, manufactured by Analog Devices Corporation.

The output signal from A/D converter 130 is connected to microprocessor 101 via line or lines 131, and the software within microprocessor 101 is designed to receive this digital information and store it in internal memory.

Microprocessor 101 has a data output port 140 for transmitting digital information of the type to be described herein to various destinations, including a display 141 destination within the aircraft to display altitude as computed by microprocessor 101.

Figure 2:
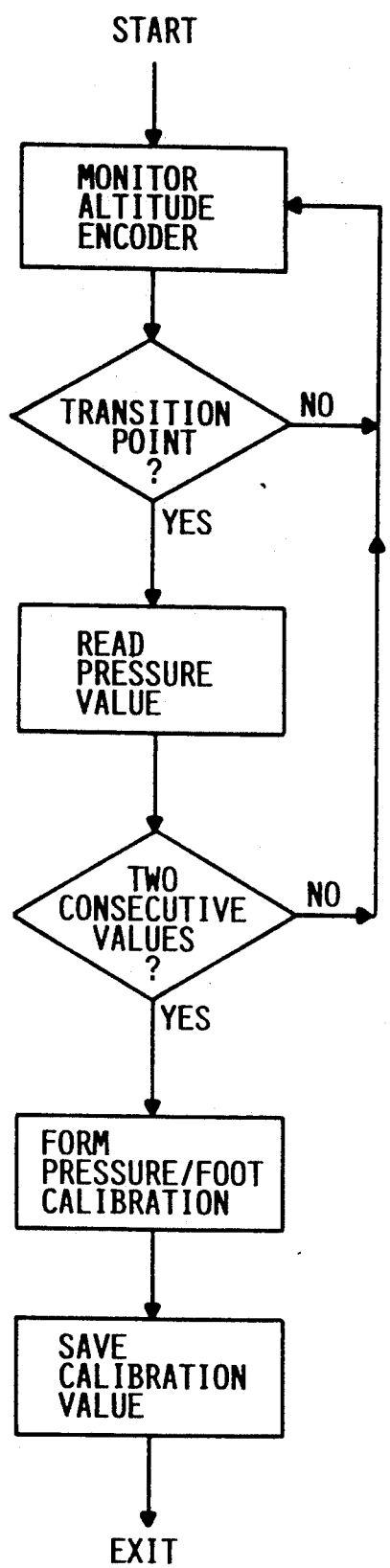
FIG. 2 shows a flow chart of the calibration process steps of the invention.
Figure 3:
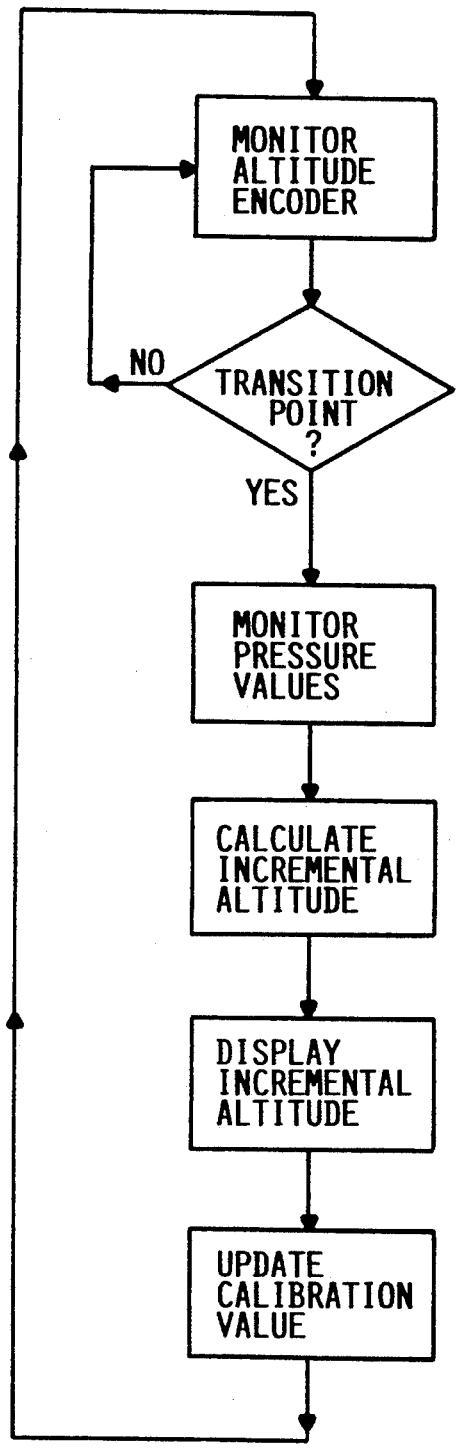
FIG. 3 shows a flow chart of the method of operating the invention.

Briefly, microprocessor 101 performs a calibration operation, and a calculation operation. The process steps for performing the calibration operation are shown in FIG. 2, and the process steps for performing the calculation operation are shown in FIG. 3. Both of these operations are performed under software control within microprocessor 101, and both processes are initiated when microprocessor 101 detects a transition point in the aircraft altitude encoder digital value which it monitors.

As shown in FIG. 2, the calibration process begins when a transition point is detected in the aircraft altitude encoder value. The transition point is detected because microprocessor 101 is programmed to monitor the altitude encoder output via digital buffer 102, and the instant a transition point is detected, microprocessor 101 reads the output signal from A/D converter 130. A/D converter 130 provides a digital output which is continuously representative of the pressure transducer 110 signal. This pressure transducer signal is recorded by microprocessor 101 within its internal memory. Microprocessor 101 then continues to monitor the altitude encoder output until a second transition point is detected, when it records a second pressure signal from A/D converter 130. Microprocessor 101 then forms a calibration calculation to provide a correlation between the two sequential transducer pressure signals and the altitude deviation between the two detected altitude encoder transition points. For example, if it is desired to subdivide the altitude values between two successive transition points into N subdivisions, microprocessor 101 calculates the incremental pressure variation for N subdivisions between the two successive recorded pressure transducer signals. Of course, the number N of subdivisions which are selected for altitude resolution must correspond to the reasonable resolution capability of the pressure transducer 110, and the A/D converter 130. For example, if the altitude encoder is capable of providing altitude indications of 100-foot intervals, and it is desired to provide altitude resolutions of 1-foot intervals, then the subdivision N equals 100. Microprocessor 101 then forms a calibration calculation to determine the incremental pressure transducer change which may be attributed to a 1-foot change in altitude. This calculation is readily performed, because the two consecutive transition points which microprocessor 101 detected from the aircraft altitude encoder represent a 100-foot interval, and microprocessor 101 had recorded the corresponding pressure transducer values at these transition points. Microprocessor 101 stores the pressure transducer calibration value, which typically is expressed in terms of X psi/altitude foot, where "X" is the calibration value for use in connection with its altitude calculation process.

The altitude calculation process is shown in FIG. 3. This process presumes that the pressure calibration process has already been performed. The process begins when a transition point is detected by microprocessor 101, from the signal it receives from digital buffer 102. Subsequent to this transition point, microprocessor 101 monitors the incremental pressure transducer changes which it receives via A/D converter 130. For each pressure measurement, microprocessor 101 applies the pressure calibration value to calculate the incremental altitude corresponding to that pressure measurement. Microprocessor 101 generates an output signal via its data output port 140 to an appropriate display 141, to display the altitude. For example, if a particular pressure transducer measurement is Y, then the value Y/X represents the incremental altitude corresponding to that pressure measurement. This incremental altitude value may be added to, or subtracted from, the respective transition point altitudes denoted by the altitude encoder, to provide an overall altitude indication which has the resolution of the calculated value.

After an initial pressure calibration value has been established, the pressure transducer may be recalibrated in real time as the calculation process is being performed. Each time microprocessor 101 detects a new transition point from the aircraft altitude encoder signals, it may retrieve the corresponding two pressure transducer values which it read at the previous transition point and the new transition point, and it may recalculate a new calibration value. Microprocessor 101 then utilizes this recalibrated pressure transducer value in calculating the incremental altitude changes to the next transition point. In this manner, the incremental altitude is not only continuously calculated, but it is continuously recalibrated, so that a very high resolution calculation may be obtained at all altitudes.

Variations in the foregoing described process are contemplated within the scope of the invention. For example, the calibration process steps may be performed periodically at regular intervals, rather than continuously during each 100-foot increment of altitude. Likewise, the process may be utilized to calculate other than 1-foot intervals of altitude variation, as determined by the needs of the user.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for forming a high resolution altitude indication from an aircraft altitude encoder providing a low resolution output signal, comprising:
   a) means for monitoring said low resolution output signal, including means for generating a coded signal value representative of said output signal, wherein said coded signal value changes at discrete transition points, thereby defining the resolution of said output signal;
   b) computer processor means for receiving said coded signal values and detecting said discrete transition points;
   c) a pressure transducer having means for developing pressure signals responsive to pressure variations occurring over a range including at least two successive ones of said discrete transition points, and means for coupling said pressure signals to said computer processor means;
   d) means in said computer processor means for calculating incremental altitude values from said pressure signals and said discrete transition points; and
   e) means for displaying said incremental values as a high resolution altitude indication.

2. The apparatus of claim 1, wherein said means for developing pressure signals further comprises an analog amplifier.

3. The apparatus of claim 2, wherein said means for coupling said pressure signals to said computer processor means further comprises an analog to digital converter.

4. The apparatus of claim 3, wherein said at least two successive ones of said discrete transition points further comprise transition points indicative of 100-foot altitude variations.

5. The apparatus of claim 4, wherein said incremental altitude values further comprise 1-foot altitude variations.

6. A method for forming high resolution altitude indications from low resolution aircraft altitude encoder signals, comprising the steps of:

a) recording the respective occurrences of at least two successive encoder signal values;
b) measuring the incremental barometric pressure variations between the recorded occurrences of said at least two successive encoder signal values;
c) converting the measured incremental barometric pressure variations into N equal subdivisions between the recorded occurrences of said at least two successive encoder signal values;
d) subdividing the difference between said at least two successive encoder signal values into N subdivisions; and
e) displaying an altitude indication by relating any particular incremental barometric pressure variation subdivision to the same encoder signal value subdivision, thereby providing a high resolution indication of altitude between said at least two low resolution altitude encoder signals.

7. The method of claim 6 where N equals 100.

* * * * *